(12) United States Patent
Zhao et al.

(10) Patent No.: US 11,202,979 B2
(45) Date of Patent: Dec. 21, 2021

(54) DEVICE FOR REDUCING PRESSURE FLUCTUATION OF PRESSURE FILTER FRAME AND PRESSURE FILTER

(71) Applicant: TIANHUA INSTITUTE OF CHEMICAL MACHINERY AND AUTOMATION CO., LTD, Gansu (CN)

(72) Inventors: Xu Zhao, Gansu (CN); Zhongxin Sun, Gansu (CN); Wanyao Zhang, Gansu (CN); Xiangnan Zhai, Gansu (CN); Guohai Zhang, Gansu (CN); Yu Guo, Gansu (CN); Xiaopeng Feng, Gansu (CN)

(73) Assignee: TIANHUA INSTITUTE OF CHEMICAL MACHINERY AND AUTOMATION CO., LTD, Gansu (CN)

( * ) Notice: Subject to any disclaimer, the term of this patent is extended or adjusted under 35 U.S.C. 154(b) by 314 days.

(21) Appl. No.: 16/330,702

(22) PCT Filed: Jul. 24, 2017

(86) PCT No.: PCT/CN2017/094057
§ 371 (c)(1),
(2) Date: Mar. 5, 2019

(87) PCT Pub. No.: WO2018/232811
PCT Pub. Date: Dec. 27, 2018

(65) Prior Publication Data
US 2020/0164291 A1    May 28, 2020

(30) Foreign Application Priority Data
Jun. 20, 2017  (CN) .................. 201710468494.X

(51) Int. Cl.
*B01D 33/80*  (2006.01)
*B01D 33/067* (2006.01)
*B01D 33/72*  (2006.01)

(52) U.S. Cl.
CPC .......... *B01D 33/80* (2013.01); *B01D 33/067* (2013.01); *B01D 33/722* (2013.01); *B01D 2201/043* (2013.01); *B01D 2201/20* (2013.01)

(58) Field of Classification Search
CPC .. B01D 33/067; B01D 33/80; B01D 2201/20; B01D 33/722; B01D 46/0005;
(Continued)

(56) References Cited

U.S. PATENT DOCUMENTS 2,259,235 A     10/1941  Weiss
10,427,073 B2 * 10/2019  Bitsch-Larsen ...... B01D 33/067
(Continued)

FOREIGN PATENT DOCUMENTS

CA    2 954 196 A1   1/2016
CN    2124754 U      12/1992
(Continued)

*Primary Examiner* — Ana M Fortuna
(74) *Attorney, Agent, or Firm* — Muncy, Geissler, Olds and Lowe, P.C.

(57) ABSTRACT

A device for reducing pressure fluctuation of a pressure filter frame and a pressure filter. The device includes a pressure filter frame that is a cylindrical housing. An inner wall of the pressure filter frame is further provided with a buffer plate. A plurality of openings are provided in the buffer plate. A gap is remained between the buffer plate and the inner wall of the pressure filter frame. A plurality of supporting posts are disposed in the gap, which fixedly connect the inner wall of the pressure filter frame with the buffer plate.

16 Claims, 3 Drawing Sheets

(58) Field of Classification Search
CPC ...... B01D 2201/0415; B01D 2265/028; B01D 46/0002
See application file for complete search history.

(56) References Cited

U.S. PATENT DOCUMENTS

| | | |
|---|---|---|
| 2005/0051473 A1 | 3/2005 | Suss et al. |
| 2015/0182890 A1* | 7/2015 | Keyes ................ B01D 33/073 562/485 |
| 2015/0290564 A1* | 10/2015 | Hoefken ................ B01D 33/23 210/331 |

FOREIGN PATENT DOCUMENTS

| | | |
|---|---|---|
| CN | 103386227 A | 11/2013 |
| CN | 203507634 U | 4/2014 |
| CN | 204798978 U | 11/2015 |
| CN | 204933012 U | 1/2016 |
| CN | 205109120 U | 3/2016 |
| CN | 106573188 A | 4/2017 |
| EP | 3147276 A1 | 3/2017 |
| JP | B1965010634 | 5/1965 |
| KR | 10-2012-0103290 A | 9/2012 |
| WO | WO-2016/014830 A1 | 1/2016 |

\* cited by examiner ns,979 B2

DEVICE FOR REDUCING PRESSURE FLUCTUATION OF PRESSURE FILTER FRAME AND PRESSURE FILTER

TECHNICAL FIELD

The present invention relates to a pressure filter for CTA (Crude Terephthalic Acid), which is one of core components of a device integrated with filtering, cleaning and drying, the structure of which may also be applied to structure of a continuous pressure filter frame in other industry.

BACKGROUND OF THE INVENTION

Pressure filter frame for CTA (Crude Terephthalic Acid) is one of core components of a pressure filter. When the device operates, slurry is pumped through a feeding zone. Due to the relatively high pressure of the slurry as it enters the feeding zone, it will impact the pressure filter frame. After the slurry has been entered into a filter cavity of a drum, the pressure in the feeding zone is removed instantaneously. Since the pressure filter runs continuously, the place of the feeding zone of the frame suffers from continuous pressure fluctuation, thereby suffering from a fatigue stress. In the practice application of the pressure filter, due to characteristics of the material, the pressure filter has relatively large pressure fluctuation when feeding. With respect to this issue, Tianhua Institute of Chemical Machinery & Automation Co., Ltd successfully develops a novel frame structure to eliminate the pressure fluctuation.

DISCLOSURE OF THE PRESENT INVENTION

The technical problem to be solved by the present invention is to provide a device for reducing pressure fluctuation of a filter frame, which can achieve an object of effectively reducing pressure fluctuation on the pressure filter frame caused by the slurry, and improving a service life of the pressure filter frame.

The object of the present invention is achieved in such ways:

The present invention discloses a device for reducing pressure fluctuation of a filter frame, comprising a pressure filter frame that is a cylindrical housing, characterized in that a buffer plate is further provided on an inner wall of the pressure filter frame, a plurality of openings are provided in the buffer plate. A gap is remained between the buffer plate and the inner wall of the pressure filter frame. A plurality of supporting posts are disposed in the gap between the buffer plate and the inner wall of the pressure filter frame, which fixedly connects the inner wall of the pressure filter frame with the buffer plate.

Further, the pressure filter frame further comprises a supporting plate and a shell provided with a feeding port and a discharging port, wherein an outer wall of the shell is covered by the supporting plate that is connected to the outer wall of the shell by welding.

Further, the buffer plate is disposed on an inner wall of the shell and is close to a feeding zone where the feeding port is located.

Further, a plurality of flange bases are arranged at intervals along a circumferential direction of the shell. The buffer plate is disposed in an interval region between the flange bases within the feeding zone.

Further, both end of the shell are provided with end flanges that connect the shell with the supporting plate by welding.

Further, the supporting posts are welded between an inner wall of the shell and the buffer plate.

Further, both ends of the shell are filled with a filler for sealing.

Further, a length or a width of the buffer plate, and number and shape of the openings varies depending on different position of the buffer plate in the feeding zone.

Further, the buffer plate has a shape of any one of a fence shape, a grid shape, and an elongated-plate shape, or any combination thereof.

The present invention further discloses a pressure filter comprising the device for reducing pressure fluctuation of a pressure filter frame.

As compared to the prior art, the present invention achieves technical effects in that:

A part of pressure fluctuation on the pressure filter frame caused by the slurry will be eliminated by the buffer plate firstly, so that the pressure fluctuation transferred to the frame will be greatly reduced, and a service life of the frame will be greatly prolonged.

Figure 1:
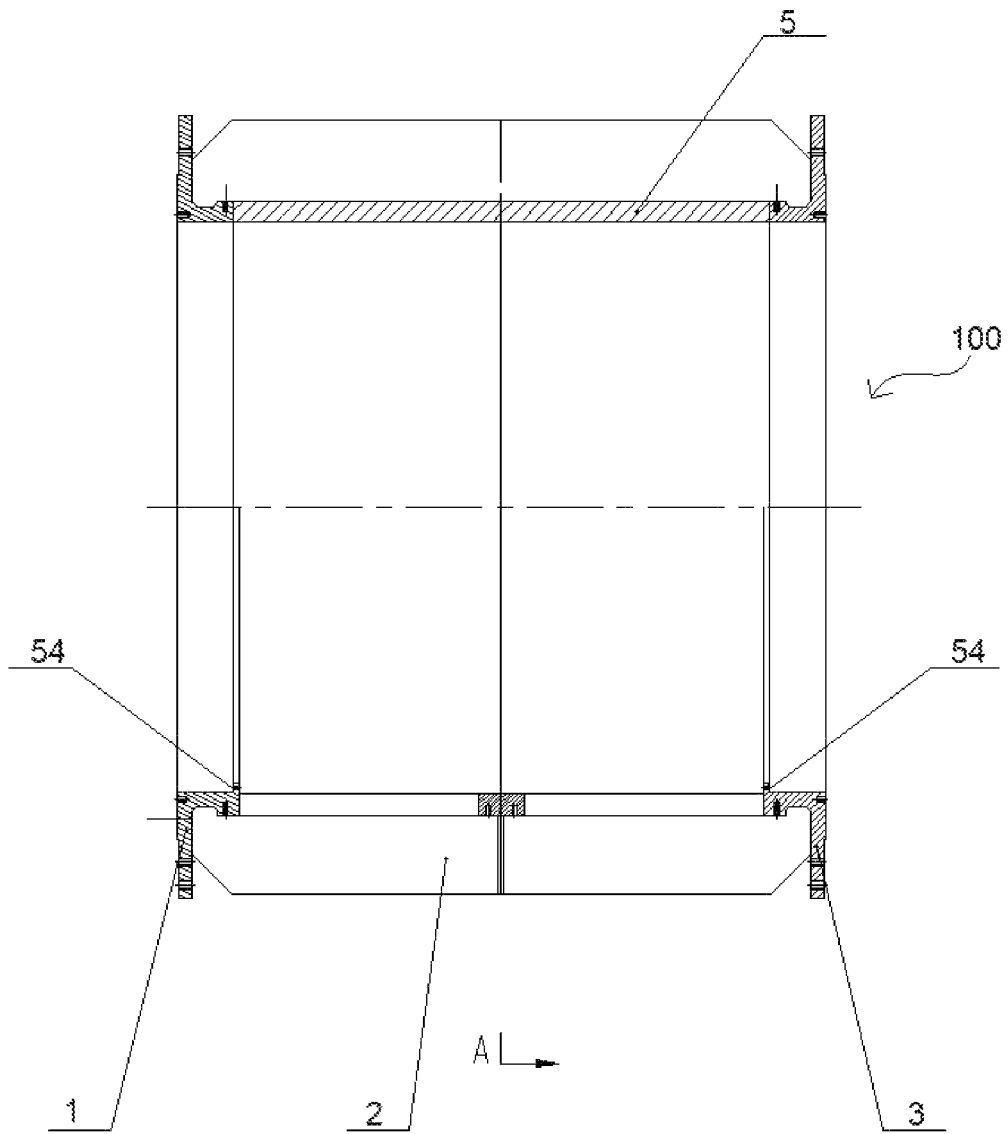
FIG. 1 is a schematic view of a pressure filter frame according to the present invention.

In the drawings, 1 end flange I; 2 supporting plate; 3 end flange II; 4 flange base I; 5 shell; 51 feeding port; 52 discharging port; 6 buffer plate; 61 round holes; 62 half round holes; 7 flange base II; 9 flange base III; 10 filter cavity; 11 drum; feeding zone A1; washing zone A2; discharging zone A3.

DETAILED DESCRIPTION OF EMBODIMENTS

Below the present invention is further explained with reference with FIGS. 1 to 6.

The present invention discloses a device for reducing pressure fluctuation of a pressure filter frame (100). The pressure filter comprises a pressure filter frame (100). The pressure filter frame further comprises a supporting plate 2 and a shell 5 provided with a feeding port 51 and a discharging port. An outer wall of the shell 5 is covered by the supporting plate 2 that is welded to the outer wall of the shell 5. Specifically, both ends of the shell 5 are provided with respective an end flange I 1 and an end flange II 3, respectively. After being welded to the shell 5, the end flange I 1 and the end flange II 3 are further welded with the supporting plate 2 into one piece. The supporting plate 2 has the function of enhancing the strength of the entire frame.

Figure 2:
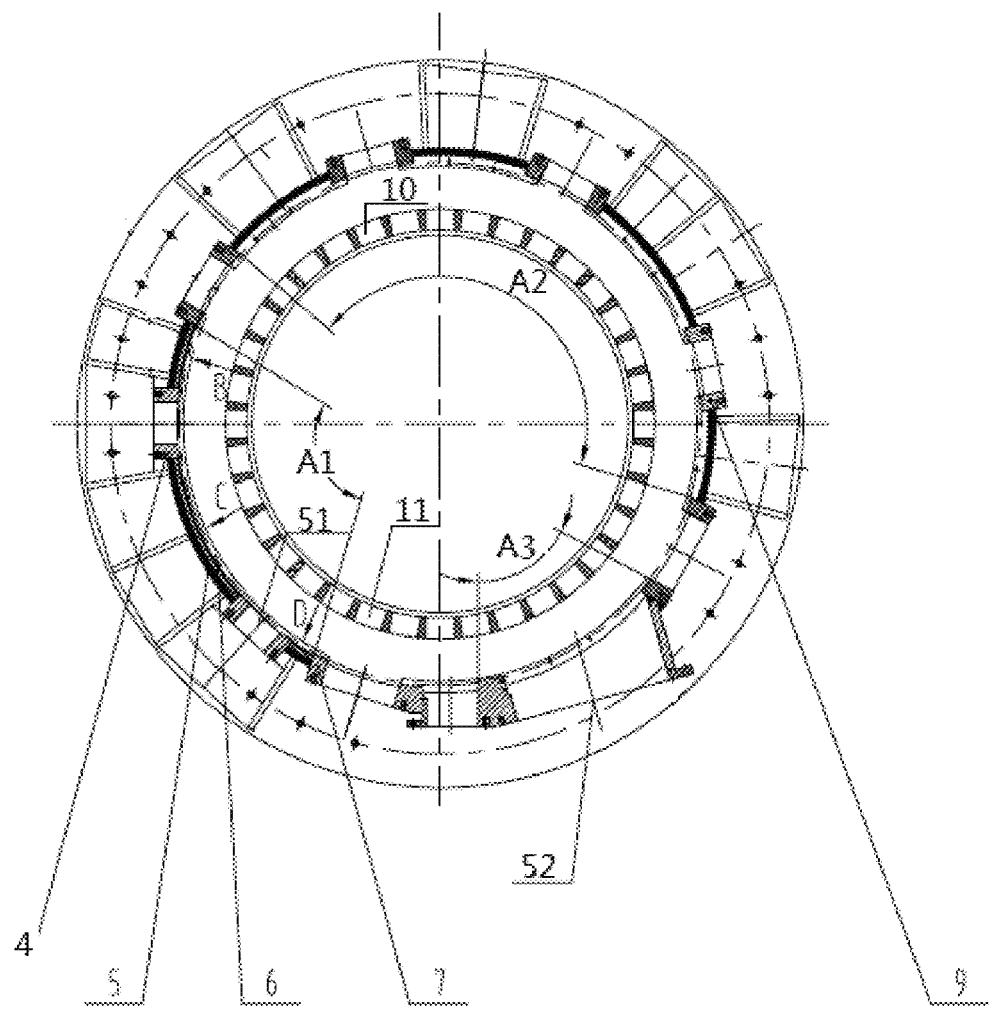
FIG. 2 is a section view along the direction A-A in FIG. 1.
Figure 3:
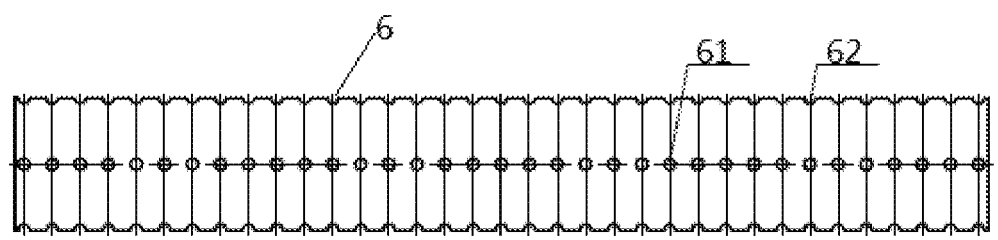
FIG. 3 is a view along the direction B in FIG. 2.
Figure 4:
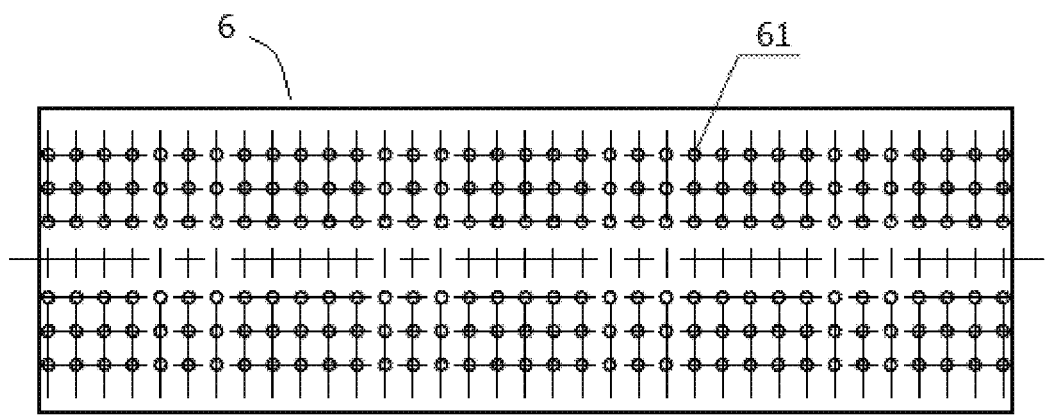
FIG. 4 is a view along the direction C in FIG. 2.
Figure 5:
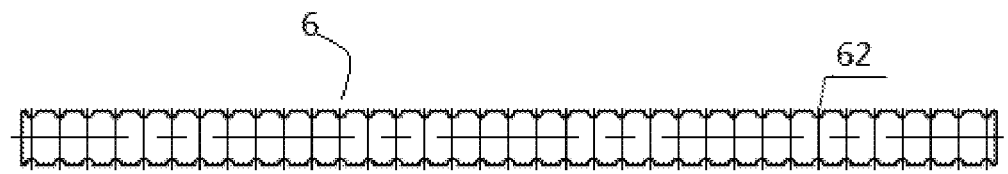
FIG. 5 is a view along the direction D in FIG. 2.
Figure 6:
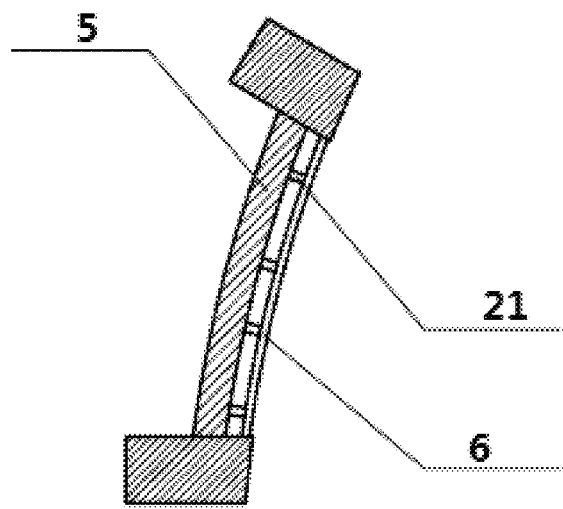
FIG. 6 is a local view of FIG. 2.

A plurality of flange bases (such as, the flange base I 4, the flange base II 7, and the flange base III 9 in FIG. 2) are arranged at intervals along a circumferential direction of the shell 5. A buffer plate 6 is arranged on an inner wall of the shell 5. After a drum 11 is putted into the shell 5, both ends of the shell 5 are sealed by fillers 54. Separators are mounted at the location of the flange bases of the frame to separate an annular space constituted by the entire frame (100) and the drum 11 into a feeding zone A1 where the buffer plate 6 is disposed, a washing zone A2 wherein the feeding port 51 is located, and a discharging zone A3 where the discharging port 53 is located. The buffer plate 6 is disposed in an interval region between the flange bases within the feeding zone A1. Referring to FIG. 6, a gap is remained between the buffer plate 6 and the shell 5. Supporting posts 21 for supporting the buffer plate 6 are disposed within the gap between the buffer plate 6 and the shell 5. The supporting posts 21 are respectively welded to the inner wall of the shell 5 and the buffer plate 6 to fixedly connect the inner wall of the pressure filter frame with the buffer plate 6.

The buffer plate 6 has a shape of any one of a fence shape, a grid shape, and an elongated-plate shape, or any combination thereof. A length or a width of the buffer plate, and number and shape of the openings may vary depending on different position of the buffer plate 6 in the feeding zone and different interval distance between the flange bases. For example, please also referring to FIGS. 3-5, in this embodiment, the directions B, C and D are all radial directions along the shell 5. In the view of the direction B, the buffer plate 6 has a shape of the fence shape, with a row of spaced openings (e.g., round holes 61) arranged at a center of the buffer plate 6 and concave openings (e.g., half-round holes 62) arranged at an edge of the buffer plate 6. In the view of the direction C, the buffer plate 6 has a shape of the elongated-plate shape, with a plurality of rows of spaced round holes being arranged along a length direction. In the view of the direction D, the buffer plate 6 has a shape of the fence shape, with concave openings, which are half round, being arranged at the edge of the buffer plate 6.

The present invention further provides a pressure filter with the device for reducing pressure fluctuation of a pressure filter frame.

In the prior art, when the pressure filter device starts, the slurry would impact on the frame due to the relatively high pressure of the slurry as it enters the feeding zone. After the slurry enters a filter cavity 10 of the drum 11, the pressure in the feeding zone is removed instantaneously. Since the pressure filter runs continuously, the place of the feeding zone of the frame suffers from continuous pressure fluctuation, thereby suffering from a fatigue stress. In the present invention, the buffer plate 6 is mounted on the inner wall of the shell 5, and the slurry will firstly enter into the gap space between the buffer plate 6 and the frame via the openings in the buffer plate 6. In such way, a part of pressure fluctuation of the frame caused by the slurry will be eliminated by the buffer plate 6 firstly, so that the pressure fluctuation transferred to the frame will be greatly reduced, and a service life of the frame will be greatly prolonged.

What is claimed is:

1. A device for reducing pressure fluctuation of a frame of a pressure filter drum, wherein the frame is a cylindrical housing and comprises a shell provided with a feeding port and a discharging port,
the device comprising:
a buffer plate disposed on an inner wall of the shell and provided with a plurality of openings, wherein a gap is remained between the buffer plate and the inner wall of the shell, and
a plurality of supporting posts disposed within the gap between the buffer plate and the inner wall of the shell and welded between the inner wall of the shell and the buffer plate, so as to fixedly connect the inner wall of the shell with the buffer plate.

2. The device for reducing pressure fluctuation of the frame of the pressure filter according to claim 1, wherein the frame of the pressure filter further comprises a supporting plate, wherein the supporting plate covers and is welded to an outer wall of the shell.

3. The device for reducing pressure fluctuation of the frame of the pressure filter according to claim 1, wherein the buffer plate is close to a feeding zone where the feeding port is located.

4. The device for reducing pressure fluctuation of the frame of the pressure filter according to claim 3, wherein a plurality of flange bases are arranged at intervals along a circumferential direction of the shell, and wherein the buffer plate is disposed in an interval region between the flange bases within the feeding zone.

5. The device for reducing pressure fluctuation of the frame of the pressure filter according to claim 4, wherein both ends of the shell are provided with end flanges that connect the shell with the supporting plate by welding.

6. The device for reducing pressure fluctuation of the frame of the pressure filter according to claim 3, wherein both ends of the shell are filled with a filler for sealing.

7. The device for reducing pressure fluctuation of the frame of the pressure filter according to claim 3, wherein a length or a width of the buffer plate, and a number and a shape of the openings vary depending on different position of the buffer plate in the feeding zone.

8. The device for reducing pressure fluctuation of the frame of the pressure filter according to claim 7, wherein the buffer plate has the shape of any one of a fence shape, a grid shape, an elongated-plate shape, or any combination thereof.

9. A pressure filter comprising:
a drum;
a frame, which is a cylindrical housing and comprises a shell provided with a feeding port and a discharging port; and
a device for reducing pressure fluctuation of the frame of the pressure filter, said device comprising:
a buffer plate disposed on an inner wall of the shell and provided with a plurality of openings, wherein a gap is remained between the buffer plate and the inner wall of the shell, and
a plurality of supporting posts disposed within the gap between the buffer plate and the inner wall of the shell, and welded between the inner wall of the shell and the buffer plate, so as to fixedly connect the inner wall of the shell with the buffer plate.

10. The pressure filter according to claim 9, wherein the frame of the pressure filter further comprises a supporting plate, wherein the supporting plate covers and is welded to an outer wall of the shell.

11. The pressure filter according to claim 9, further comprising an annular space defined by the frame and the drum and separated into a plurality zones including a feeding zone, wherein the buffer plate is close to the feeding zone where the feeding port is located.

12. The pressure filter according to claim 11, wherein a plurality of flange bases are arranged at intervals along a circumferential direction of the shell, and wherein the buffer plate is disposed in an interval region between the flange bases within the feeding zone.

13. The pressure filter according to claim 12, wherein both ends of the shell are provided with end flanges that connect the shell with the supporting plate by welding.

14. The pressure filter according to claim 11, wherein both ends of the shell are filled with a filler for sealing.

15. The pressure filter according to claim 11, wherein a length or a width of the buffer plate, and a number and a shape of the openings vary depending on different position of the buffer plate in the feeding zone.

16. The pressure filter according to claim 15, wherein the buffer plate has a shape of any one of a fence shape, a grid shape, an elongated-plate shape, or any combination thereof.

\* \* \* \* \*